United States Patent
Lee et al.

(10) Patent No.: US 10,137,424 B2
(45) Date of Patent: Nov. 27, 2018

(54) DISTRIBUTOR AND DOWN FLOW CATALYTIC REACTOR COMPRISING SAME

(71) Applicant: LG CHEM, LTD., Seoul (KR)

(72) Inventors: Jun Young Lee, Daejeon (KR); Young Soo Song, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/749,740

(22) PCT Filed: Aug. 23, 2016

(86) PCT No.: PCT/KR2016/009288
§ 371 (c)(1),
(2) Date: Feb. 1, 2018

(87) PCT Pub. No.: WO2017/039207
PCT Pub. Date: Mar. 9, 2017

(65) Prior Publication Data
US 2018/0221892 A1   Aug. 9, 2018

(30) Foreign Application Priority Data
Aug. 28, 2015 (KR) .................. 10-2015-0121687

(51) Int. Cl.
*B01J 8/02* (2006.01)
*B01J 8/04* (2006.01)
(Continued)

(52) U.S. Cl.
CPC .............. *B01J 8/0278* (2013.01); *B01J 4/00* (2013.01); *B01J 8/0453* (2013.01); *B01J 8/0492* (2013.01);
(Continued)

(58) Field of Classification Search
CPC ...... B01J 8/0278; B01J 8/0492; B01J 8/0446; B01J 8/0453; B01J 2208/00938; B01J 2208/00902; B01D 3/20; B01D 3/205
See application file for complete search history.

(56) References Cited

U.S. PATENT DOCUMENTS

| 5,158,714 A | 10/1992 | Shih et al. |
| 5,799,877 A | 9/1998 | Gupta et al. |

(Continued)

FOREIGN PATENT DOCUMENTS

| EP | 1846150 B1 | 10/2007 |
| JP | 2008528248 A | 7/2008 |

(Continued)

*Primary Examiner* — Lessanework Seifu
(74) *Attorney, Agent, or Firm* — Dentons US LLP

(57) ABSTRACT

The present invention relates to a distributor and a down flow catalytic reactor comprising same, and according to one aspect of the present invention, provides a distributor comprising: an inside downcomer which has a first flow space; an outside downcomer which is disposed so as to surround at least some area of the inside downcomer, and has a second flow space partitioned from the first flow space of the inside downcomer; an outside cap which has a plurality of first slots and is mounted on the inside downcomer so as to enable a fluid that has passed through the first slots to flow to the first flow space; and an inside cap which has a plurality of second slots and is mounted on the outside downcomer so as to enable a fluid that has passed through the second slots to flow to the second flow space.

23 Claims, 4 Drawing Sheets

(51) Int. Cl.
*B05B 1/14* (2006.01)
*B01J 19/26* (2006.01)
*B01J 4/00* (2006.01)

(52) U.S. Cl.
CPC ............... *B01J 19/26* (2013.01); *B05B 1/14* (2013.01); *B01J 2208/00902* (2013.01); *B01J 2208/00938* (2013.01)

(56) References Cited

U.S. PATENT DOCUMENTS 8,202,498 B2 * 6/2012 Killen .................... B01J 8/0453
422/607
2013/0082125 A1 4/2013 Akin et al.

FOREIGN PATENT DOCUMENTS

| KR | 1020010098536 A | 11/2001 |
| KR | 1020050004804 A | 1/2005 |
| KR | 1020140088175 A | 7/2014 |

* cited by examiner

[Figure 1]
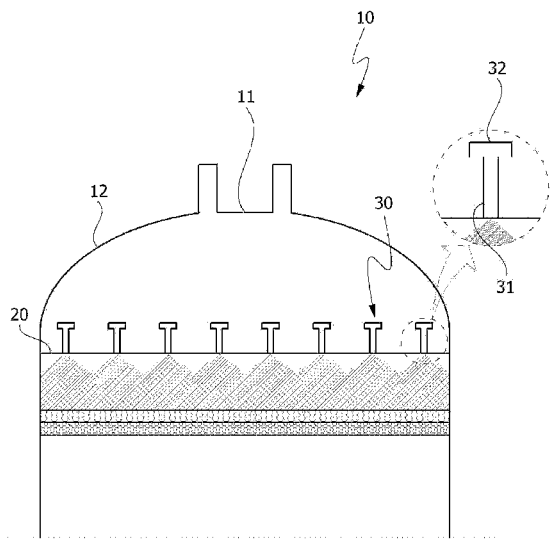
[Figure 2]
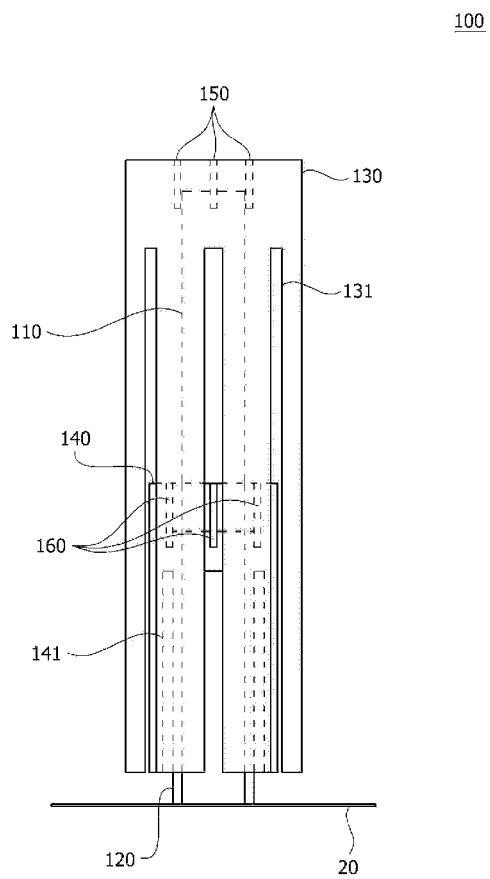

[Figure 3]
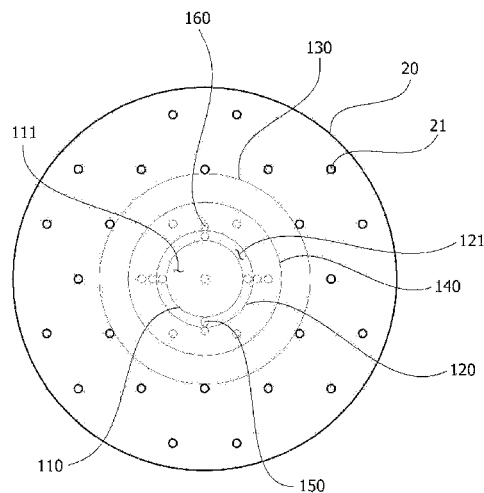
[Figure 4]
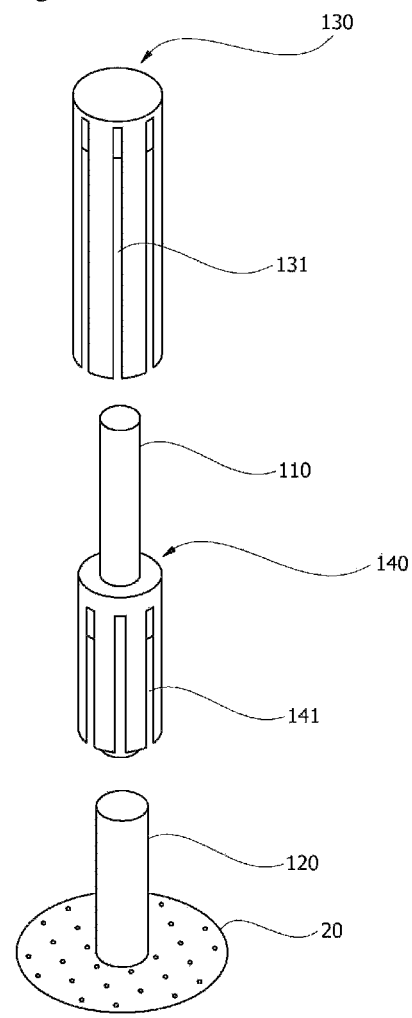

[Figure 5]
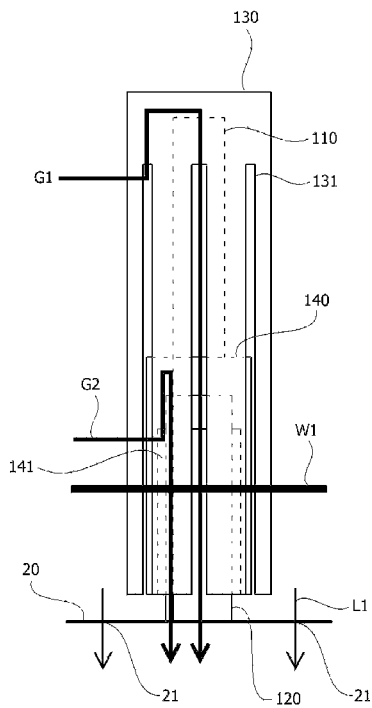
[Figure 6]
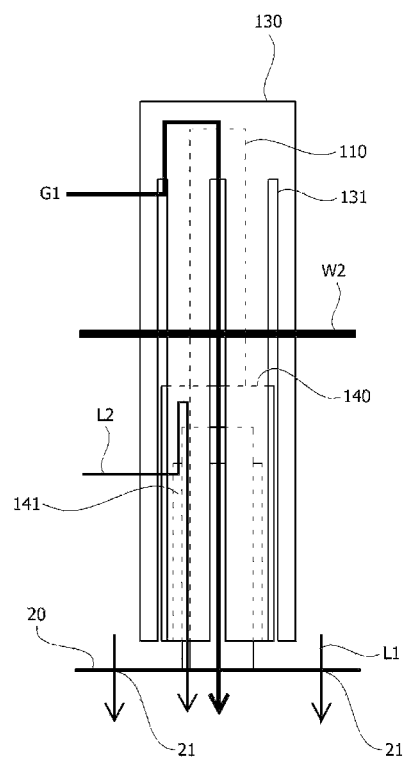

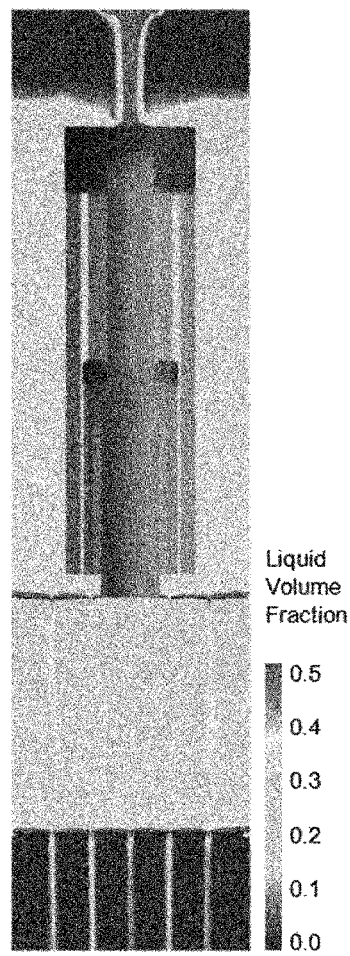
[Figure 7]

DISTRIBUTOR AND DOWN FLOW CATALYTIC REACTOR COMPRISING SAME

This application is a National Stage Application of International Application No. PCT/KR2016/009288, filed Aug. 23, 2016, and claims the benefit of Korean Patent Application No. 10-2015-0121687, filed Aug. 28, 2015, contents of which are incorporated herein by reference in their entirety for all purposes as if fully set forth below.

TECHNICAL FIELD

The present invention relates to a distributor and a down flow catalytic reactor comprising the same.

The present application claims the benefit of priority based on Korean Patent Application No. 10-2015-0121687, filed on Aug. 28, 2015, the disclosure of which is incorporated herein by reference in its entirety.

BACKGROUND ART

In general, a down flow catalytic reactor involves a gas-liquid mixing process. In such a process, a liquid phase is mixed with a gas or vapor phase, and while the mixture passes over a solid packed bed in the reactor, the reaction takes place. In the reactor, the gas and liquid phases must be properly mixed and uniformly distributed before contacting the solid phase catalyst packed bed.

FIG. 1 is a conceptual diagram showing a general down flow catalytic reactor (10).

The reactor (10) comprises a housing (12) having an inlet (11), a dispersion tray (20) disposed in the housing (12) and a plurality of distributors (30) provided in the dispersion tray (20).

Here, the dispersion tray (20) has a plurality of holes through which the liquid phase can pass.

In addition, the distributor (30) comprises a chimney (31) and a cap (32) provided so as to surround the chimney (31). The chimney (31) has a cylindrical structure having a hollow portion into which the gas phase can enter via the upper part. Also, the gas flows through the space between the chimney (31) and the cap (32) and flows down the dispersion tray (20) through the chimney (31). On the other hand, when the liquid level on the dispersion tray (20) becomes high, the inlet of the chimney (31) becomes clogged, and the gas does not flow down the dispersion tray (20) through the chimney (31). Therefore, there is a problem that distribution and dispersion efficiency is lowered.

DISCLOSURE

Technical Problem

It is a problem to be solved by the present invention to provide a distributor having high mixing and distribution efficiency and a down flow catalytic reactor comprising the same.

Technical Solution

In order to solve the above-described problem, according to one aspect of the present invention, there is provided a distributor comprising an inside downcomer which has a first flow space, an outside downcomer which is disposed so as to surround at least some area of the inside downcomer and has a second flow space partitioned from the first flow space of the inside downcomer, an outside cap which has a plurality of first slots and is mounted on the inside downcomer so that a fluid passing through the first slots can flow into the first flow space, and an inside cap which has a plurality of second slots and is mounted on the outside downcomer so that a fluid passing through the second slots can flow into the second flow space.

The inside cap is disposed inside the outside cap such that the fluid passing through the first slots passes through the second slots and is moved into the second flow space.

In addition, according to another aspect of the present invention, there is provided a down flow catalytic reactor comprising a housing having an inlet, a dispersion tray disposed inside the housing and having a plurality of flow holes, and a plurality of distributors mounted on the dispersion tray.

Each distributor comprises an inside downcomer which has a first flow space, an outside downcomer which is disposed so as to surround at least some area of the inside downcomer and has a second flow space partitioned from the first flow space of the inside downcomer, an outside cap which has a plurality of first slots and is mounted on the inside downcomer so that a fluid passing through the first slots can flow into the first flow space, and an inside cap which has a plurality of second slots and is mounted on the outside downcomer so that a fluid passing through the second slots can flow into the second flow space.

In addition, the down flow catalytic reactor is provided such that when the liquid-gas mixture is supplied into the housing, the gas flowing through the first slots flows into the first flow space and the gas or the liquid passing through the first slots and the second slots in order depending on the liquid level on the dispersion tray flows into the second flow space.

Advantageous Effects

As described above, the distributor related to one embodiment of the present invention and the down flow catalytic reactor comprising the same have high mixing efficiency and distribution efficiency.

BRIEF DESCRIPTION OF DRAWINGS

FIG. 1 is a conceptual diagram showing a general down flow catalytic reactor.

FIG. 2 is a conceptual diagram showing a distributor related to one embodiment of the present invention.

FIG. 3 is a cross-sectional view of the distributor shown in FIG. 2.

FIG. 4 is an exploded perspective view of the distributor shown in FIG. 2.

FIGS. 5 and 6 are conceptual diagrams for explaining one operating state of the distributor related to the present invention.

FIG. 7 is a simulation result of the distributor shown in FIG. 2.

MODE FOR INVENTION

Hereinafter, a distributor according to one embodiment of the present invention and a down flow catalytic reactor comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 2 is a conceptual view showing a distributor related to one embodiment of the present invention, FIG. 3 is a cross-sectional view of the distributor shown in FIG. 2, and FIG. 4 is an exploded perspective view of the distributor shown in FIG. 2.

FIGS. 5 and 6 are conceptual diagrams for explaining one operating state of the distributor related to the present invention, and FIG. 7 is a simulation result of the distributor shown in FIG. 2.

The down flow catalytic reactor related to one embodiment of the present invention comprises a housing (12) (see FIG. 1) having an inlet (11) (see FIG. 1) and a dispersion tray disposed inside the housing (12) and having a plurality of flow holes (21), and a plurality of distributors (100) mounted on the dispersion tray (20).

The distributor (100) related to one embodiment of the present invention comprises an inside downcomer (110) and an outside downcomer (120), and an outside cap (130) and an inside cap (140).

The inside downcomer (110) has a first flow space (111). The inside downcomer (110) has a first diameter and a first height. In addition, the inside downcomer (110) has a hollow cylinder shape. Furthermore, the first flow space (111) is provided such that both end parts are each opened along the height direction of the inside downcomer (110).

The outside downcomer (120) is disposed to surround at least some area of the inside downcomer (110). Here, the outside downcomer (120) is provided to have a second diameter larger than the first diameter and a second height lower than the first height. The outside downcomer (120) has a second flow space (121) partitioned from the first flow space (111). The second flow space (121) may be defined as a space between the outer peripheral surface of the inside downcomer (110) and the inner peripheral surface of the outside downcomer (120). For example, the first flow space (111) may have a circular cross section, and the second flow space (121) may have a ring-shaped cross section. In addition, the outside downcomer (120) has a hollow cylinder shape. Furthermore, the second flow space (121) is provided such that both end parts are each opened along the height direction of the outside downcomer (120).

Also, the inside downcomer (110) and the outside downcomer (120) may be disposed such that each center axis is coaxially positioned. In addition, both the inside downcomer (110) and the outside downcomer (120) are disposed to be positioned on the dispersion tray (20). Both the inside downcomer (110) and the outside downcomer (120) can be mounted on the dispersion tray (20). Furthermore, the first height and the second height, as described above, are all heights defined based on the dispersion tray (20).

The outside cap (130) has a plurality of first slots (131). In one example, the plurality of first slots (131) may be provided along the circumferential direction of the outside cap (130), respectively. Also, each of the first slots (131) may be elongated along the height direction of the outside cap (130). The height direction of each cap (130, 140) and the height direction of each downcomer (110, 120) herein are used to mean the same direction.

The outside cap (130) is mounted on the inside downcomer (110). Also, the outside cap (130) is mounted on the inside downcomer (110) so that the fluid passing through the first slots (131) can flow into the first flow space (111). Furthermore, the outside cap (130) is formed to have a diameter larger than that of the outside downcomer (120).

In addition, specifically explaining the structure in which the outside cap (130) is mounted and fixed to the inside downcomer (110), the distributor (100) may comprise a first fixing element (150) for fixing the outside cap (130) and the inside downcomer (110).

Here, the first fixing element (150) may be provided in a number of elements, and thus the distributor (100) may comprise a plurality of first fixing elements (150). That is, the outside cap (130) is mounted and fixed to the inside downcomer (110) through the plurality of first fixing elements (150). For example, the first fixing element (150) may have the same shape as a column, and connect the outside cap (130) and the inside downcomer (110) at regular intervals (for example, 90°) along the circumference direction of the inside downcomer (110).

Also, the first fixing element (150) may be provided so as to fix the outside cap (130) and the inside downcomer (110) in a spaced state. In this structure, the fluid passing through the first slots (131) of the outside cap (130) is raised to the upper region of the inside downcomer (110). At this time, the raised fluid is moved to the first flow space (111) through the spaced space of the inside downcomer (110) and the outside cap (130). Thereafter, a downward flow of the fluid introduced from the first flow space (111) is performed, and the fluid passes through the dispersion tray (20) (a plurality of flow holes) to flow down the dispersion tray (20).

Meanwhile, the inside cap (140) has a plurality of second slots (141). In one example, the plurality of second slots (141) may be provided along the circumferential direction of the inside cap (140), respectively. Also, each second slot (141) may be elongated along the height direction of the inside cap (140).

The inside cap (140) is mounted on the outside downcomer (120). Also, the inside cap (140) is mounted on the outside downcomer (120) so that the fluid passing through the second slots (141) can flow into the second flow space (121). In addition, the inside cap (140) is disposed inside the outside cap (130) such that the fluid passing through the first slots (131) passes through the second slots (141) and is moved into the second flow space (121). For this purpose, the inside cap (140) is formed to have a diameter smaller than that of the outside cap (130). Also, the inside cap (140) is formed to have a diameter larger than that of the outside downcomer (120).

In addition, specifically explaining the structure in which the inside cap (140) is mounted and fixed to the outside downcomer (120), the distributor (100) may comprise a second fixing element (160) for fixing the inside cap (140) and the outside downcomer (120).

Here, the second fixing element (160) may be provided in a number of elements, and thus the distributor (100) may comprise a plurality of second fixing elements (160). That is, the inside cap (140) is mounted and fixed to the outside downcomer (120) through the plurality of second fixing elements (160). For example, the second fixing element (160) may have the same shape as a column, and connect the inside cap (140) and the outside downcomer (120) at regular intervals (for example, 90°) along the circumference direction of the outside downcomer (120).

Meanwhile, the second fixing element (160) may be provided so as to fix the inside cap (140) and the outside downcomer (120) in a spaced state. The fluid passing through the first slots (131) of the outside cap (130) sequentially passes through the second slots (141) of the inside cap (140) and then is raised to the upper region of the outside downcomer (120). At this time, the raised fluid is moved to the second flow space (121) through the spaced space of the outside downcomer (120) and the inside cap (140). Thereafter, the downward flow of the fluid introduced from the second flow space (121) is performed, and the fluid passes through the dispersion tray (20) (a plurality of flow holes) to flow down the dispersion tray (20).

In addition, the outside cap (130) may be disposed to surround the inside cap (140), the outside downcomer (120) and at least some area of the inside downcomer (110), respectively. Furthermore, the inside cap (140) is disposed so as to surround the outside downcomer (120). Also, the outside downcomer (120) is disposed so as to surround at least some area of the inside downcomer (110). Also, the inside downcomer (110) may be provided to penetrate the inside cap (140) and the inside downcomer (110) may be integrally formed with the inside cap (140).

On the other hand, based on the dispersion tray (20), the inside cap (140) is provided to have a height lower than that of the outside cap (130). Also, the second slot (141) is formed to have an opened length shorter than that of the first slot (131).

Specifically, the first slot (131) is formed along the height direction of the outside cap (130). Also, the plurality of first slots (131) may be formed at regular intervals along the circumferential direction of the outside cap (130). Each first slot (131) may be elongated along the height direction of the outside cap (130). In addition, it is preferred that the first slots (131) are provided to be opened from the lower end of the outside cap (130) to a height between the inside downcomer (110) and the outside downcomer (120). Furthermore, the outside cap (130) may be disposed so that the lower end is spaced apart from the dispersion tray (20).

Meanwhile, the second slot (141) is formed along the height direction of the inside cap (140). Also, the plurality of second slots (141) may be formed at regular intervals along the circumferential direction of the inside cap (140). Each second slot (141) may be elongated along the height direction of the inside cap (140). In addition, it is preferred that the second slots (141) are provided to be opened from the lower end of the inside cap (140) to a height lower than the height of the outside downcomer (120). Furthermore, the inside cap (140) may be disposed such that the lower end is spaced apart from the dispersion tray (20). Besides, the lower ends of the second slot (141) and the first slot (131) in the inside cap (140) and the outside cap (130) may be provided to be positioned at the same height based on the dispersion tray (20).

The distributor (100) has a first flow channel connecting the first slot (131) and the first flow space (111) and a second flow channel connecting the first slot (131), the second slot (141) and the second flow space (121). Here, the first flow channel may be formed to be longer than the length of the second flow channel, based on a specific position of the first slot (131).

Referring to FIGS. 5 and 6, when a liquid-gas mixture is supplied into the housing, the liquid accumulates on the dispersion tray (20) and the liquid level on the dispersion tray (20) can be raised.

Referring to FIG. 5, when the liquid level (W1) on the dispersion tray (20) is lower than the height of the outside downcomer (120), the gas flows down the dispersion tray (20) through at least one of the first flow channel (see G1) and the second flow channel (see G2). At this time, the liquid flows down the dispersion tray through the flow holes (21) of the dispersion tray (20) (see L1).

Referring to FIG. 6, when the liquid-gas mixture is supplied into the housing and the liquid level (W2) on the dispersion tray (20) is higher than the height of the outside downcomer (120), the gas flows down the dispersion tray (20) through the first flow channel (see G1) and the liquid flows down the dispersion tray (20) through the second flow channel (see L2).

Specifically, when the liquid level (W2) on the dispersion tray (20) is higher than the height of the outside downcomer (120) and lower than the height of the inside downcomer (120), the gas flows down the dispersion tray (20) through the first flow channel (see G1) and the liquid flows down the dispersion tray (20) through the second flow channel (see L2).

Of course, when the liquid-gas mixture is supplied into the housing and the liquid level (W2) on the dispersion tray (20) is higher than the height of the inside downcomer (120), the liquid will flow down the dispersion tray (20) through the first channel and the second flow channel.

On the other hand, the unexplained symbol L1 represents a liquid flow moving down the dispersion tray (20) through the flow holes (21) of the dispersion tray (20).

To sum up, when the liquid-gas mixture is supplied into the housing, the down flow catalytic reactor is provided so that the gas passing through the first slots (131) flows into the first flow space (111) and the gas or the liquid sequentially passing through the first and second slots (131, 141) depending on the liquid level on the dispersion tray (20) flows into the second flow space (121).

The preferred example of the present invention as described above is disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

The distributor related to one embodiment of the present invention and the down flow catalytic reactor comprising the same have high mixing efficiency and distribution efficiency.

The invention claimed is:

1. A distributor comprising an inside downcomer which has a first flow space;
   an outside downcomer which is disposed so as to surround at least some area of the inside downcomer and has a second flow space partitioned from the first flow space of the inside downcomer;
   an outside cap which has a plurality of first slots and is mounted on said inside downcomer so that a fluid passing through the first slots can flow into the first flow space; and
   an inside cap which has a plurality of second slots and is mounted on said outside downcomer so that a fluid passing through the second slots can flow into the second flow space.

2. The distributor according to claim 1, wherein
   the inside cap is disposed inside the outside cap such that the fluid passing through the first slots passes through the second slots and is moved into the second flow space.

3. The distributor according to claim 1, wherein
   the distributor is provided so that the inside downcomer has a first diameter and a first height, and
   the outside downcomer has a second diameter larger than the first diameter and a second height lower than the first height.

4. The distributor according to claim 1, wherein the inside downcomer is provided so as to penetrate the inside cap.

5. The distributor according to claim 4, wherein the inside downcomer is integrally formed with the inside cap.

6. The distributor according to claim 1, wherein the inside cap is provided to have a height lower than that of the outside cap, and the second slot is formed to have an opened length shorter than that of the first slot.

7. The distributor according to claim 1, wherein the distributor comprises a first fixing element for fixing the outside cap and the inside downcomer, and the first fixing element is provided so as to fix the outside cap and the inside downcomer in a spaced state.

8. The distributor according to claim 1, wherein the distributor comprises a second fixing element for fixing the inside cap and the outside downcomer, and the second fixing element is provided so as to fix the inside cap and the outside downcomer in a spaced state.

9. The distributor according to claim 1, wherein the inside downcomer and the outside downcomer have each a hollow cylinder shape, and are disposed such that each center axis is coaxially positioned.

10. A down flow catalytic reactor comprising a housing having an inlet;
a dispersion tray disposed inside said housing and having a plurality of flow holes; and
a plurality of distributors mounted on said dispersion tray, wherein
each distributor comprises an inside downcomer which has a first flow space;
an outside downcomer which is disposed so as to surround at least some area of the inside downcomer and has a second flow space partitioned from the first flow space of the inside downcomer;
an outside cap which has a plurality of first slots and is mounted on said inside downcomer so that a fluid passing through the first slots can flow into the first flow space; and
an inside cap which has a plurality of second slots and is mounted on said outside downcomer so that a fluid passing through the second slots can flow into the second flow space.

11. The down flow catalytic reactor according to claim 10, wherein
the inside cap is disposed inside the outside cap such that the fluid passing through the first slots passes through the second slots and is moved into the second flow space.

12. The down flow catalytic reactor according to claim 10, wherein
the down flow catalytic reactor is provided so that the inside downcomer has a first diameter and a first height, and
the outside downcomer has a second diameter larger than the first diameter and a second height lower than the first height.

13. The down flow catalytic reactor according to claim 10, wherein
the inside downcomer is integrally formed with the inside cap so as to penetrate the inside cap.

14. The down flow catalytic reactor according to claim 10, wherein
said first and second slots are formed along the height direction of the outside cap and the inside cap, respectively, and
said first slots are provided to be opened from the lower end of said outside cap to a height between the inside downcomer and the outside downcomer.

15. The down flow catalytic reactor according to claim 14, the second slots are provided to be opened from the lower end of said inside cap to a height lower than the height of the outside downcomer.

16. The down flow catalytic reactor according to claim 10, wherein
said distributor has a first flow channel connecting the first slot and the first flow space and a second flow channel connecting the first slot, the second slot and the second flow space.

17. The down flow catalytic reactor according to claim 16, wherein
the first flow channel is formed to be longer than the length of the second flow channel, based on a specific position of the first slot.

18. The down flow catalytic reactor according to claim 16, wherein
when a liquid-gas mixture is supplied into the housing and the liquid level on the dispersion tray is lower than the height of the outside downcomer, the gas flows down the dispersion tray through at least one of the first flow channel and the second flow channel.

19. The down flow catalytic reactor according to claim 16, wherein
when a liquid-gas mixture is supplied into the housing and the liquid level on the dispersion tray is higher than the height of the outside downcomer, the gas flows down the dispersion tray through the first flow channel and the liquid flows down the dispersion tray through the second flow channel.

20. The down flow catalytic reactor according to claim 10, wherein
the down flow catalytic reactor comprises a plurality of first fixing elements for fixing the outside cap and the inside downcomer, and
the first fixing element is provided so as to fix the outside cap and the inside downcomer in a spaced state.

21. The down flow catalytic reactor according to claim 10, wherein
the down flow catalytic reactor comprises a plurality of second fixing elements for fixing the inside cap and the outside downcomer, and
the second fixing element is provided so as to fix the inside cap and the outside downcomer in a spaced state.

22. The down flow catalytic reactor according to claim 10, wherein
the inside downcomer and the outside downcomer have each a hollow cylinder shape, and
are disposed such that each center axis is coaxially positioned.

23. A down flow catalytic reactor comprising a housing having an inlet, a dispersion tray disposed inside said housing and having a plurality of flow holes and a plurality of distributors mounted on said dispersion tray, wherein
each distributor comprises an inside downcomer which has a first flow space;
an outside downcomer which is disposed so as to surround at least some area of the inside downcomer and has a second flow space partitioned from the first flow space of the inside downcomer;

an outside cap which has a plurality of first slots and is mounted on said inside downcomer so that a fluid passing through the first slots can flow into the first flow space; and an inside cap which has a plurality of second slots and is mounted on said outside downcomer so that a fluid passing through the second slots can flow into the second flow space, and wherein when a liquid-gas mixture is supplied into the housing, the gas passing through the first slots flows into the first flow space and the gas or the liquid sequentially passing through the first and second slots depending on the liquid level on the dispersion tray flows into the second flow space.

* * * * *